United States Patent [19]
Frerichs et al.

[11] Patent Number: 5,175,678
[45] Date of Patent: Dec. 29, 1992

[54] METHOD AND PROCEDURE FOR NEURAL CONTROL OF DYNAMIC PROCESSES

[75] Inventors: Donald K. Frerichs, Shaker Heights; Azmi Kaya, Akron; Marion A. Keyes, IV; Chagrin Falls, all of Ohio

[73] Assignee: Elsag International B.V., Amsterdam - Zuidoost, Netherlands

[21] Appl. No.: 567,873

[22] Filed: Aug. 15, 1990

[51] Int. Cl.⁵ ............................................. G05B 13/02
[52] U.S. Cl. ..................................... 364/148; 364/165
[58] Field of Search ...................... 364/148, 164, 165; 395/21

[56] References Cited

U.S. PATENT DOCUMENTS

| | | | |
|---|---|---|---|
| 4,912,753 | 3/1990 | Evans, Jr. ............................ | 364/165 |
| 4,928,484 | 5/1990 | Peczkowski ........................ | 60/240 |
| 5,023,045 | 6/1991 | Watanabe et al. .................. | 364/148 |

Primary Examiner—Jerry Smith
Assistant Examiner—Paul Gordon
Attorney, Agent, or Firm—Vytas R. Matas; Robert J. Edwards

[57] ABSTRACT

A neural network control based on a general multi-variable nonlinear dynamic model incorporating time delays is disclosed. The inverse dynamics of the process being controlled is learned represented by a multi-layer neural network which is used as a feedforward control to achieve a specified closed loop response under varying conditions. The weights between the layers in the neural network are adjusted during the learning process. The learning process is based on minimizing the combined error between the desired process value and the actual process output and the error between the desired process value and the inverse process neural network output.

1 Claim, 7 Drawing Sheets

METHOD AND PROCEDURE FOR NEURAL CONTROL OF DYNAMIC PROCESSES

TECHNICAL FIELD

The present invention relates, in general, to neural network controls and, more particularly, to an improved neural network control which can be used for a dynamic process.

BACKGROUND ART

Providing the desired performance and adaptive robust control for a dynamic process having delays and nonlinearities are a current challenge in the control field. Significant progress has been made relative to such control but there is still substantial room for improvement. An increase in computational power has given a significant incentive to control advancements. The use of neural networks for identification and control of such processes is presently being investigated by researchers.

Neural networks have been used successfully is many control applications, however, the use of such networks in controlling a dynamic process is still in its infancy. A feedback procedure commonly known as "backpropagation" and "delta rule" have been used in some methods. For self-tuning and adaptive control, backpropagation is utilized for nonlinear dynamic processes where the dynamics of the process are assumed to have feedback linearizable form, and control values are calculated directly from the neural network estimated model. Several learning and control methods have been proposed for neural network control. Typically, the most common methods utilize off-line training for non-dynamic processes. Another approach involves estimating the inverse dynamics of processes by minimizing the error between the process input and the inverse dynamic output. This inverse model, in turn, is used as a feedforward type controller to provide a minimum error between the desired and actual value of the process.

All of the foregoing approaches have certain inherent disadvantages. For example, the method and procedure of a particular approach may be restricted to a certain type of process with a defined, rather than a general, structure. In addition, the approach might require that the process have an equal number of input and output variables for implementation purposes. Alternatively, training a neural network feedforward control based on minimizing the error between the control value entering the process and the trained control value produced by the inverse process does not necessarily minimize the error between the desired and the actual process values. Furthermore, using a combination of any of the foregoing approaches cannot eliminate problems since specialized learning typically is not readily adaptable to an on-line application for a dynamic process.

Because of the foregoing, it has become desirable to develop a method and procedure for a neural network control for dynamic processes which considers both the error between the desired process value and the actual process output and the error between the desired process value and the inverse process value (trained control value) in order to eliminate the problems associated with the learning activity.

SUMMARY OF THE INVENTION

The present invention solves the problems associated with the prior art and other problems by a novel neural network control based on a general multi-variable nonlinear dynamic model incorporating time delays. The inverse dynamics of the process being controlled is learned and represented by a multi-layer neural network which is used as a feedforward control to achieve a specified closed loop response under varying conditions. The inverse dynamics of the process are learned by adjusting the weights between the layers within the multi-layer neural network. The network learning process is based on minimizing the combined error between the desired process value and the actual process output and the error between the desired process value and the inverse process neural network output (trained control value). The control concept disclosed can cover various control approaches, including cascade control loops. The control process can be implemented in real time using a distributed control system.

DESCRIPTION OF THE PREFERRED EMBODIMENT

Figure 1:
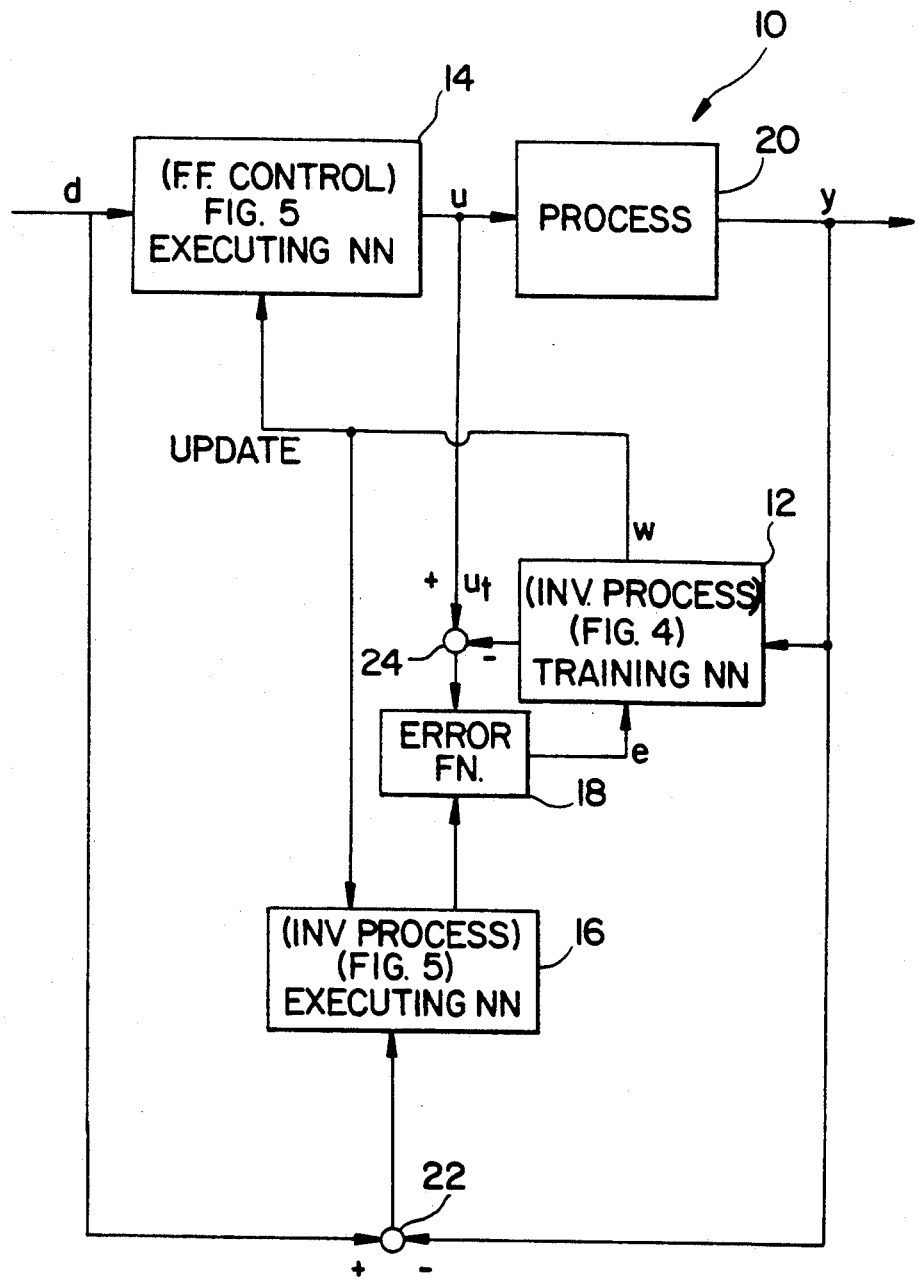
FIG. 1 is a block diagram of the neural network control system of the present invention.

Referring now to the drawings where the illustrations are for the purposeof describing the preferred embodiment of the present invention and are not intended to limit the invention described herein, FIG. 1 is a block diagram of the neural network control system 10 of the present invention. Neural network control system 10 is comprised of an inverse process training neural network 12, a feedforward control executing neural network 14, an inverse process executing neural network 16, an error function generator 18 and a block, shown generally by the numeral 20, representing the process to be controlled. The desired process value d is an input to the feedforward control executing neural network 14 and is connected to the positive input to an adder 22 whose output is connected to an input to the inverse process executing neural network 16. The response y from the process 20 being controlled is connected to the negative input to adder 22 and to an input to inverse process training neural network 12. The output u of feedforward control executing neural network 14 is connected to the input to the process 20 being controlled and to the positive input to an adder 24. An output $u_t$ from the inverse process training neural network 12 is connected to the negative input to the adder 24 whose output is connected to the error function generator 18. The other input to the error function generator 18 is connected to the output of the inverse process executing neural network 16. The output e of the error function generator 18 is connected to an input to the inverse process training neural network 12. Another output of the inverse process training neural network 12 that provides the weighting values W is connected to an input to the feedforward executing neural network 14 and to an input to the inverse process executing neural network 16.

The inverse process training neural network 12 acts on the desired process value d and produces a signal u that drives the output y of the process 20 to a value where y=d. In essence, the inverse process training neural network 12 takes the desired process value d and causes the feedforward executing neural network 14 to produce an appropriate output u which, as an input to the process 20 being controlled, causes the output of process 20 to approach the desired process value d. The foregoing is accomplished by using the error between the desired process value d and actual output y of the process and the error between the input u to the process 20 and the input $u_t$ developed by the inverse process training neural network 12 to adjust the weights w produced by the inverse process training neural network 12 to minimize the resulting total error. The foregoing is represented by the following equation:

$$J = \sigma \ (d-y)^2 - (1-\sigma) \ (u-u_t)^2 \quad (1)$$

where $\sigma$ is a constant which is determined through experimentation. In this equation, $d-y$ represents the difference between the desired process response and the actual process output and $u-u_t$ represents the difference between the input to the process being controlled and an output of the inverse process training neural network 12. In this case, the objective is to minimize J according to the generalized delta rule.

Figure 2:
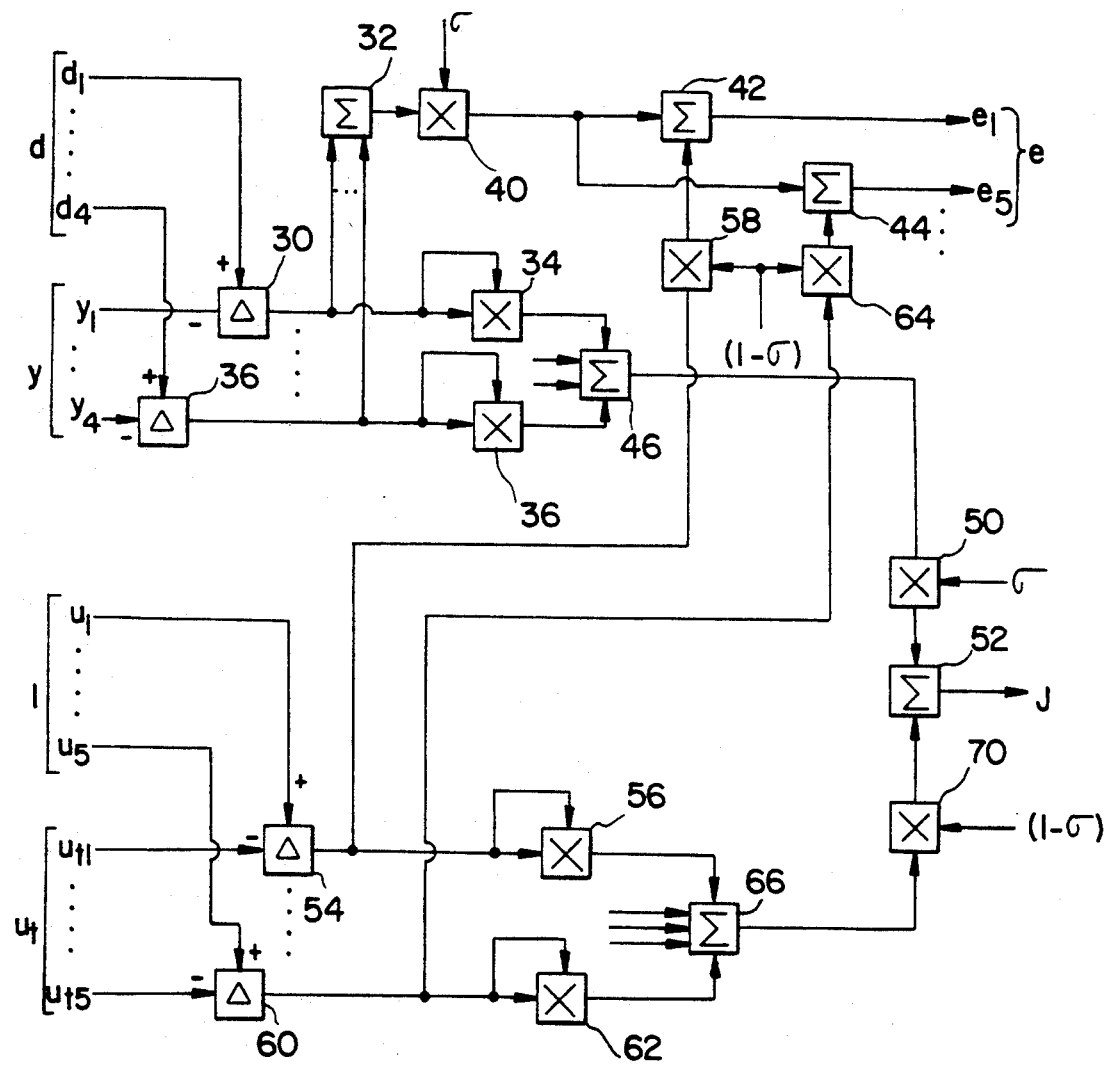
FIG. 2 is a logic diagram of the performance function J and error function e for the neural network control system illustrated in FIG. 1.

Referring now to FIG. 2, a diagram of the logic for developing the performance function J and the error function e for five inputs and four outputs is illustrated. Desired process value $d_1$ and process output $y_1$ are applied to the positive and negative inputs, respectively, to a subtracter 30 whose output is connected to the input to a summer 32 and to the two inputs to a multiplier 34. Similarly, desired process value $d_4$ and process output $y_4$ are applied to the positive and negative inputs, respectively, to a subtracter 36 whose output is connected to two inputs to a multiplier 38 and to the other input to summer 32. The output of summer 32 is connected to an input to a multiplier 40 whose other input has a signal having a value $\sigma$ applied thereto. The output of multiplier 40 is connected to an input to a summer 42 and an input to a summer 44. The output of summer 42 represents a combined error $e_1$ between desired process value $d_1$ and process output $y_1$, and between the inverse process output $u_{t1}$ and feedforward output $u_1$. Similar logics are provided to determine the other combined errors $e_2$, $e_3$, $e_4$, $e_5$ for other process values $d_2$, $d_3$, and $d_4$ and respective process outputs $y_2$, $y_3$ and $y_4$, and inverse process outputs $u_{t2}$, $u_{t3}$, $u_{t4}$, $u_{t5}$ and feedforward control outputs $u_2$, $u_3$, $u_4$, $u_5$. For example, note $e_5$ at the output of summer 44. The outputs of multipliers 34 and 38 are applied as inputs to a summer 46 whose output is connected to the input to a multiplier 50. The other input to multiplier 50 has a signal having a value $\sigma$ applied thereto. The output of multiplier 50 is connected to an input to summer 52. Input $u_1$ and output $u_{t1}$ from inverse process training neural network 12 are applied respectively to the positive and negative inputs to a subtracter 54 whose output is connected to the two inputs to a multiplier 56 and to an input to a multiplier 58. Similarly, input $u_5$ and output $u_{t5}$ from inverse process training neural network are respectively applied to the positive and negative inputs to a subtracter 60 whose output is connected to the two inputs to a multiplier 62 and to the input to a multiplier 64. The other inputs to multipliers 58 and 64 have a signal having a value $1-\sigma$ applied thereto. The output of multiplier 58 is connected to an input to summer 42. And, similarly the output of multiplier 64 is connected to an input to summer 64. The outputs of multipliers 56 and 62 are connected to the inputs to a summer 66 whose output is connected to the input to a multiplier 70. The other input to multiplier 70 has a signal having a value $1-\sigma$ applied thereto. The output of multiplier 70 is connected to an input to summer 52 whose output represents the performance function J.

Figure 3:
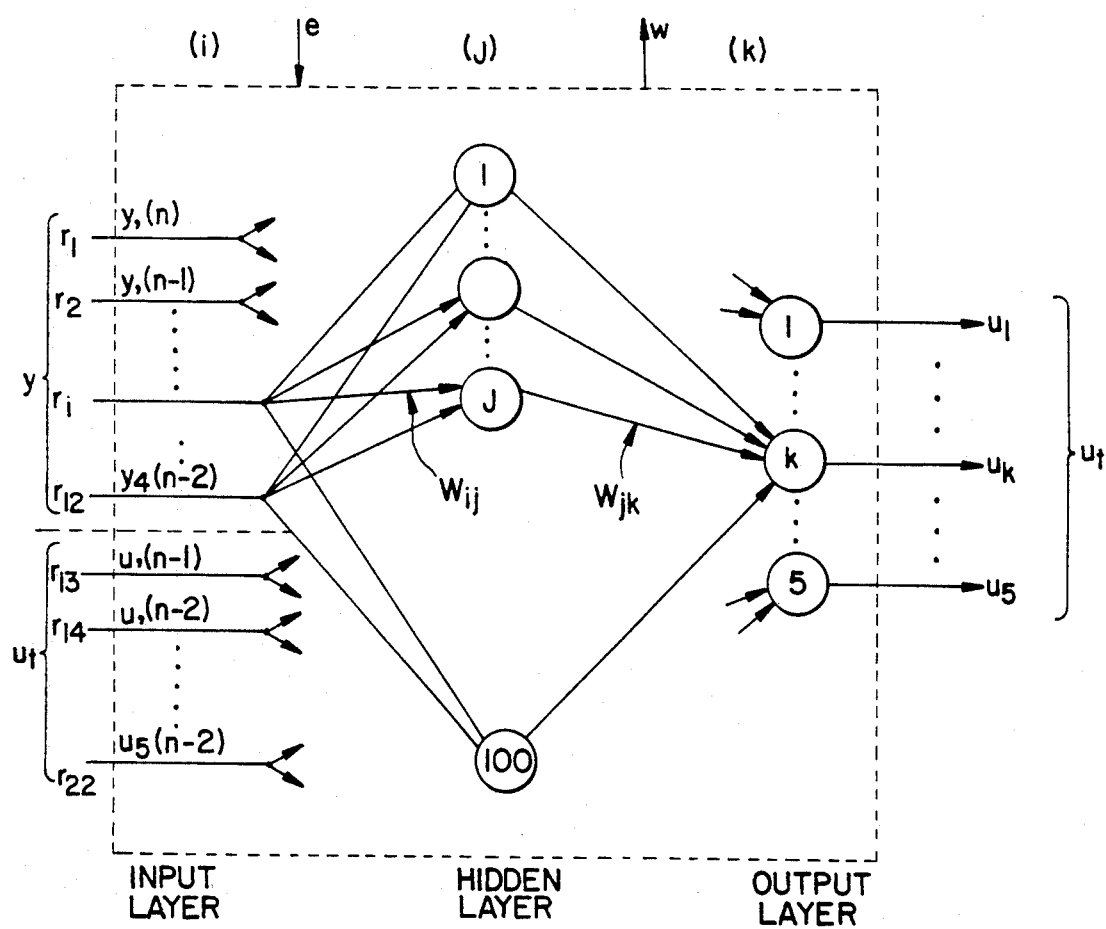
FIG. 3 is a schematic diagram of the internal structure of a neural network showing the layers therein.

The internal structure of a neural network, such as inverse process training neural network 12, or feedforward control executing neural network 14 or inverse process executing neural network 16, is shown in FIG. 3. Such a neural network consists of an input layer, an output layer and a hidden layer interposed therebetween. The hidden layer contains processing elements which can be nonlinear. The contains processing elements which can be nonlinear. The processing elements, which sum incoming signals and generate output signals according to some predefined function, are called neurons. The neurons are connected by terms having variable weights. The output of one neuron multiplied by the weight becomes the input to the adjacent neuron of the next layer. There is no limit as to the number of hidden layers or as to the number of neurons in each layer. FIG. 3 shows a neural network having five inputs, $u_1, \ldots, u_5$ and four outputs, $y_1, \ldots, y_4$, as an example. Here again, there is no limit as to the number of inputs or outputs and the number of inputs do not have to be the same as the number of outputs.

The training procedure for the inverse process training neural network 12 is given by the following equations which follow the procedure of backpropagation and generalized delta rule. In these equations, the subscripts represent the following:

i = input layer
j = hidden layer
k = output layer
n = time index
r = inputs

The training procedure is similar to that disclosed in relevant literature and no additional information regarding the derivation of the following equations is needed. The hidden layer (j) relations are as follows:

$$Net_j = \sum_{ij} W_{ij} d_i \quad (2)$$

$$Out_j = 1/[1 + \exp(-Net_j)] \quad (3)$$

The output layer (k) relations are as follows:

$$Net_k = \sum_{jk} W_{jk} Out_j \quad (4)$$

-continued $$Out_k = 1/[1 - \exp(-Net_k)] \qquad (5)$$

The learning relationships by backpropagation and the gradient method (delta rule) for the hidden layer (j) to the output layer (k) are as follows:

$$W_{jk}(m) = W_{jk}(m-1) - \epsilon e_k(\epsilon u_k/\epsilon W_{jk}) \qquad (6)$$

where $\epsilon$ is a parameter for learning rate. The relationships between the input layer (i) and the hidden layers (j) are as follows:

$$\delta_k = u_t(1 - u_t)e \qquad (7)$$

$$\delta_j = Out_j(1 - Out_j) \sum_{jk} \delta_k W_{jk}(n-1) \qquad (8)$$

$$\Delta W_{ij} = \eta \delta_j d_i \qquad (9)$$

$$W_{ij}(m) = W_{ij}(m-1) + \Delta W_{ij} \qquad (10)$$

In the foregoing latter equations, $\eta$ is a parameter representative of a learning rate. After the weight (w) values are found by the inverse process training neural network 12, the feedforward control executing neural network 14 and the inverse process executing neural network 16 are updated.

Figure 4:
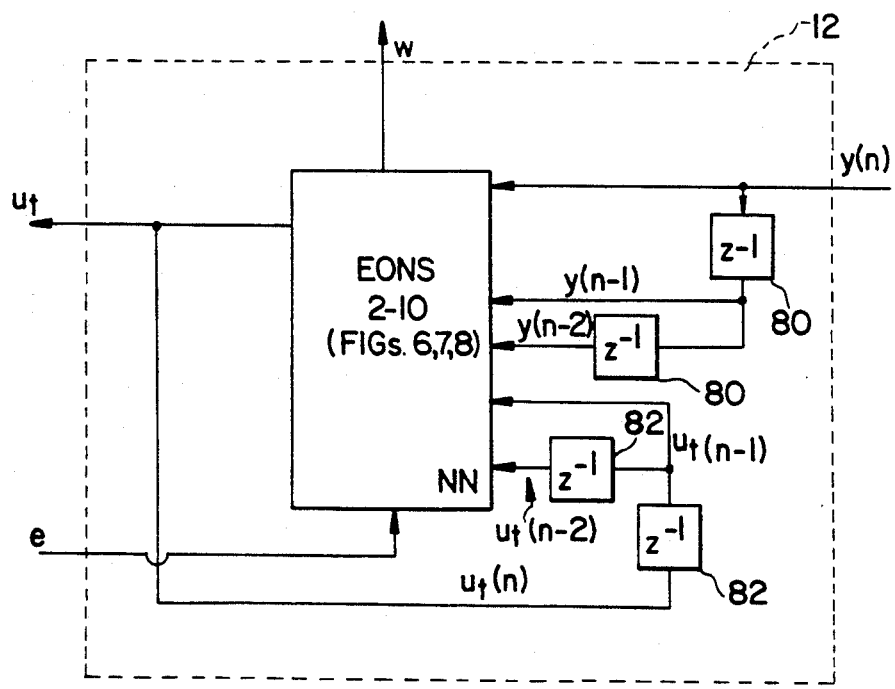
FIG. 4 is a block diagram of the inverse process training neural network utilized in FIG. 1.

Referring now to FIG. 4, the inputs to and the outputs from the inverse process training neural network 12 are shown. As can be seen, the inputs y(n) are the outputs from the process 20 being controlled and input e is the output from the error function generator 18. Similarly, the outputs $u_t$ are transmitted to the summer 24 and the output w is transmitted to the feedforward control executing neural network 14 and the inverse process executing neural network 16. The input y(n) is delayed by a time delay 80 producing inputs y(n−1) and inputs y(n−2) to the inverse process training neural network 12. Similarly, output $u_t$ is connected to a time delay 82 to produce inputs $u_t$(n−1) and $u_t$(n−2) in a feedback relationship to inverse process training neural network 12. It should be noted that inverse process neural network 12 performs all of the aforementioned equations 2 through 10.

Figure 5:
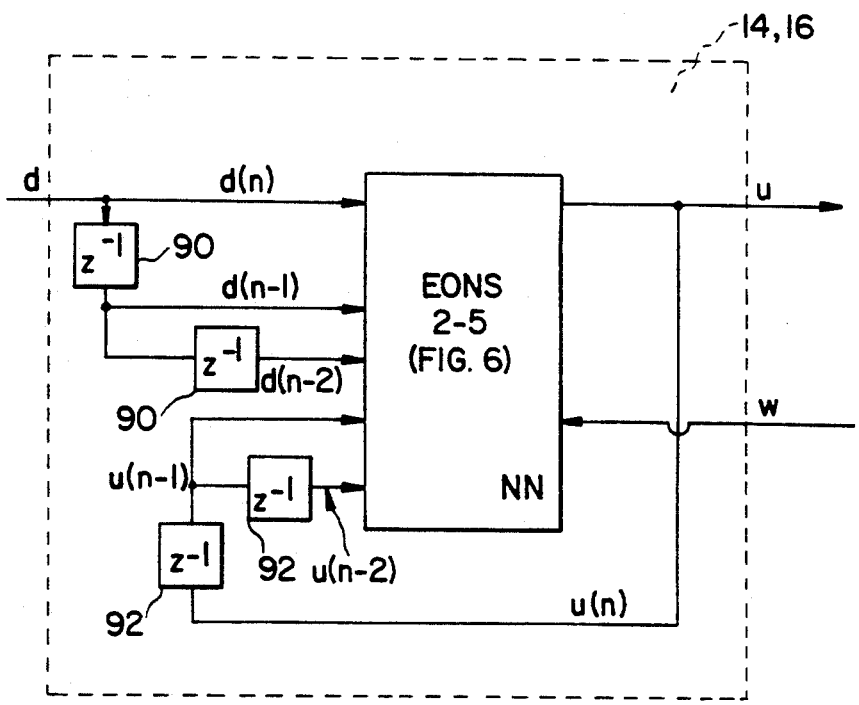
FIG. 5 is a block diagram of the feedforward control executing neural network which is the inverse process executing neural network utilized in FIG. 1.

Referring now to FIG. 5, the inputs to and the outputs from the feedforward control executing neural network 14 and the inverse process executing neural network 16 are shown. In this case, the input d represents the desired process value, the input w is received from the inverse process training neural network 12 and the output u is transmitted to the process 20 being controlled and to the summer 24. In this case, the input d is delayed by a time delay 90 to produce inputs d(n−1) and d(n−2) to the feedforward control executing neural network 14 or the inverse process executing neural network 16. Similarly, the output u is delayed by a time delay 92 in a feedback loop arrangement to produce inputs u(n−1) and u(n−2) to the feedforward control executing neural network 14 or the inverse process executing neural network 16. It should be noted that the feedforward control executing neural network 14 and the inverse process executing neural network 16 perform the aforementioned Equations 2 through 5.

Figure 6:
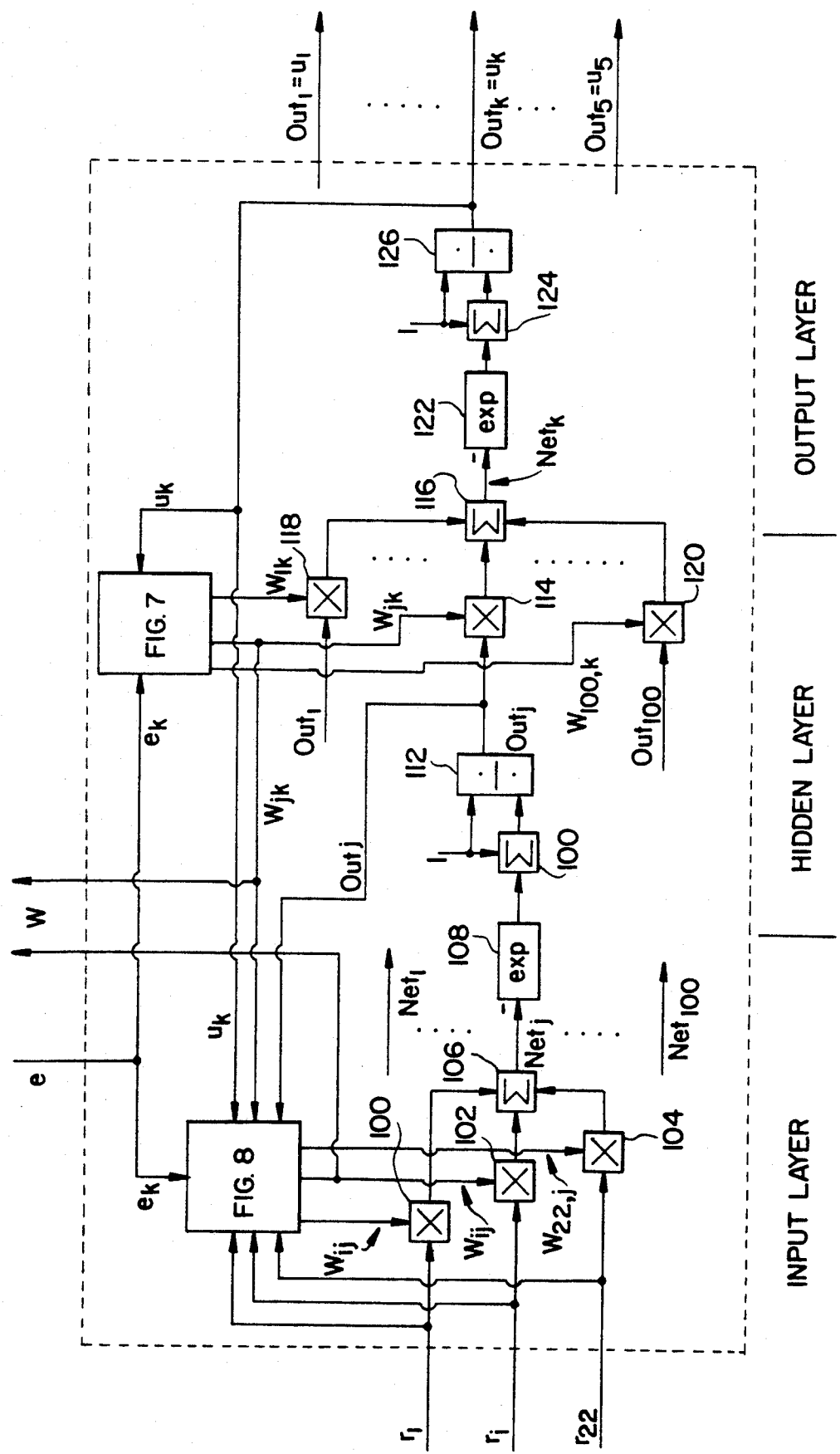
FIG. 6 is a logic diagram of the neural networks utilized in FIGS. 4 and 5.

Referring now to FIG. 6, a schematic diagram of the neural network logic utilized by the inverse process training neural network 12, the feedforward control executing neural network 14 and the inverse process executing neural network 16 is shown. In this case, the inputs are shown as $r_1$, $r_i$, $r_{22}$ with the intention that they represent inputs y to the inverse process training neural network 12, inputs d to the feedforward control executing neural network 14 and inputs d−y to the inverse process executing neural network 16. The foregoing inputs $r_1$, $r_i$ and $r_{22}$ are respectively applied to multipliers 100, 102 and 104 whose outputs are connected to a summer 106. The output of summer 106 represents the resultant $Net_j$ of Equation 2 and the negative thereof is applied to the input to an exponential function generator 108. The output of exponential function generator 108 is connected to the input to a summer 110 whose other input is connected to a signal representing unity. The output of summer 110 is connected to a divider 112 whose other input is similarly connected to a signal representing unity. The output of divider 112 represents the resultant $Out_j$ of Equation 3 and is connected to the input to a multiplier 114 whose other input is connected to weighting factor $W_{jk}$ and produces an output which is connected to a summer 116. The other inputs to summer 116 are similar signals from multiplier 118 and multiplier 120. Multiplier 118 has signals representative of weight $W_{1k}$ and output $Out_1$ applied to its inputs, whereas multiplier 120 has weights $W_{100, k}$ and output $Out_{100}$ applied to its inputs. The output of summer 116 represents the resultant $Net_k$ of Equation 4, and the negative thereof is applied to an exponential function generator 122 whose output is connected to an input to a summer 124 whose other input is connected to a signal representing unity. The output of summer 124 is connected to a divider 126 whose other input is connected to a signal representing unity. The output of divider 126 represents the resultant $Out_k$ of Equation 5. All of the aforementioned functions illustrated in FIG. 6 are common to inverse process training neural network 12, feedforward control executing neural network 14 and inverse process executing neural network 16. The block shown as FIG. 7 in FIG. 6 is the weight update logic for the hidden to output layers (Equation 6) whereas the block shown as FIG. 8 in FIG. 6 is the weight update logic for the input to hidden layers (Equations 7 through 10).

Figure 7:
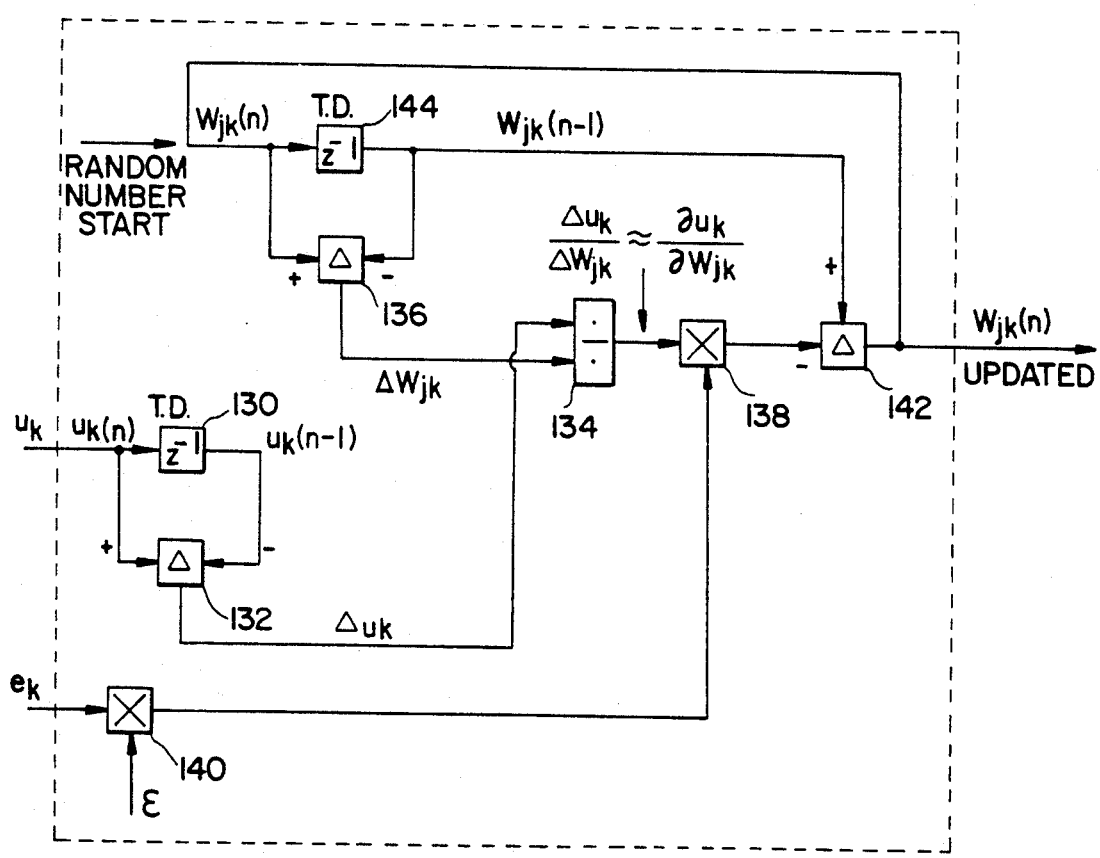
FIG. 7 is a diagram of the weight update logic for the hidden to output layers of the neural network shown in FIG. 6.

Referring now to FIG. 7, the output $u_k$ of divider 126 is connected to a time delay 130 and to the positive input to a subtracter 132. The output of time delay 130 is connected to the negative input of subtracter 132. The output of subtracter 132 represents $\Delta u_k$ and is applied to the input to a divider 134. The other input to divider 134 represents $\Delta W_{jk}$ which is the output of a subtracter 136. The output of divider 134 represents the following equation:

$$\frac{\Delta \mu_k}{\Delta W_{jk}} \approx \frac{\partial \mu_k}{\partial W_{jk}}$$

and is connected to the input to a multiplier 138. The other input to multiplier 138 is connected to the output of a multiplier 140 having signals $e_k$ and $\epsilon$ connected to its inputs. In this case, $\epsilon$ is a parameter representative of learning rate. The output of multiplier 138 is connected to the negative input to a subtracter 142. The output of subtracter 142 is connected to a time delay 144 and to the positive input to subtracter 136. The output of time delay 144 is connected to the negative input to subtracter 136 and the positive input to subtracter 142. The output of subtracter 142 represents $W_{jk}(n)$ of Equation 6 and is connected to the inputs to multipliers 114, 118 and 120, as shown in FIG. 6.

Figure 8:
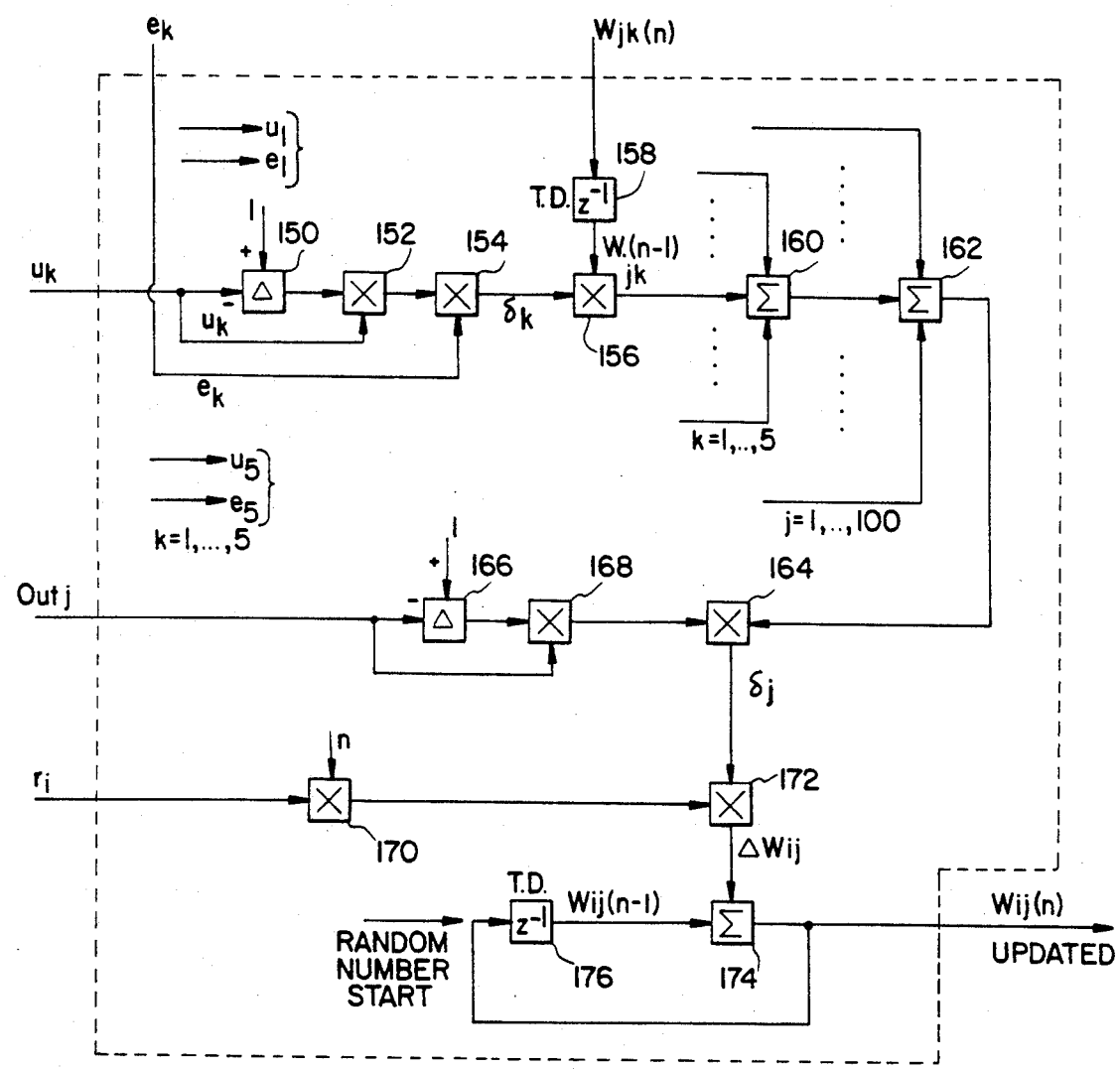
FIG. 8 is a diagram of the weight update logic for the input to hidden layers of the neural network shown in FIG. 6.

Referring now to FIG. 8, the output $u_k$ of divider 126 is connected to the negative input to a subtracter 150 whose positive input is connected to a signal representing unity. The output of subtracter 150 is connected to an input to a multiplier 152 whose other input has the signal $\mu_k$ applied thereto. The output of multiplier 152 is connected to an input to a multiplier 154 whose other input has the error signal from error function generator 18 applied thereto. The output of multiplier 154 represents the resultant $\delta_k$ of Equation 7. The output of multiplier 154 is connected to the input of a multiplier 156. Signal $W_{jk}(n)$ which represents the output of FIG. 7 is applied to a time delay 158 whose output is connected to the other input to multiplier 156. All of the outputs from similar multipliers 156 are connected to a summer 160. Similarly, all of the outputs from similar multipliers 160 are connected to the inputs to a summer 162 whose output is connected to an input to a multiplier 164. The output from divider 112 which represents $Out_j$ is connected to the negative input to a subtracter 166 whose positive input is connected to a signal representing unity. The output of subtracter 166 is connected to a multiplier 168 whose other input has a signal representing $Out_j$ applied thereto. The output of multiplier 168 is connected to an input to multiplier 164. The output of multiplier 164 represents $\delta_j$ of Equation 8. The input $d_i$ (shown as $r_i$) is connected to an input to a multiplier 170 whose other input is connected to a signal representing $\eta$. The output of multiplier 170 is connected to an input to a multiplier 172 whose other input is connected to the output of multiplier 164. The output of multiplier 172 represents the resultant $\Delta W_{ij}$ of Equation 9. The output of multiplier 172 is connected to a summer 174 whose output is connected to its input by a feedback loop including a time delay 176. The output of multiplier 174 represents the resultant $W_{ij}(n)$ of Equation 10.

The implementation of the present invention is performed in real time in a distributed control system. The control system, including the operator interaction, can be a common industrial application. The process is considered to be a "black box" and no knowledge is required of the process except inputs and outputs. The control functions can be implemented by "C" language utilized by the multi-function controller module.

The use of a distributed control system greatly facilitates the implementation of the present invention. It has been found that manual and automatic modes of operation can be readily obtained in real time with minimal difficulty. Operator interface, graphic displays and an indication of trends of variables are available for visual storage and recording purposes.

Certain modifications and improvements will occur to those skilled in the art upon reading the foregoing. It should be noted that all such modifications and improvements have been deleted herein for the sake of conciseness and readability, but are properly with the scope of the following claims.

We claim:

1. A system for controlling a dynamic process to produce a desired process value comprising means for producing an inverse dynamics of the process being controlled, means responsive to said inverse dynamics producing means, said responsive means modifying the desired process value to produce a signal causing an output of the process to approach the desired process value, first means for determining an error between the desired process value and the output of the process, said inverse dynamic producing means being responsive to the error produced by said first error determining means, and second means for determining the error between the desired process value and the output of said inverse process dynamics producing means, said inverse dynamic producing means being responsive to the error produced by said second error producing means.

* * * * *